March 15, 1960     J. E. LILIENFELD     2,929,004
ELECTROLYTIC CAPACITOR AND SEPARATOR THEREFOR
Filed Sept. 28, 1953     2 Sheets-Sheet 1
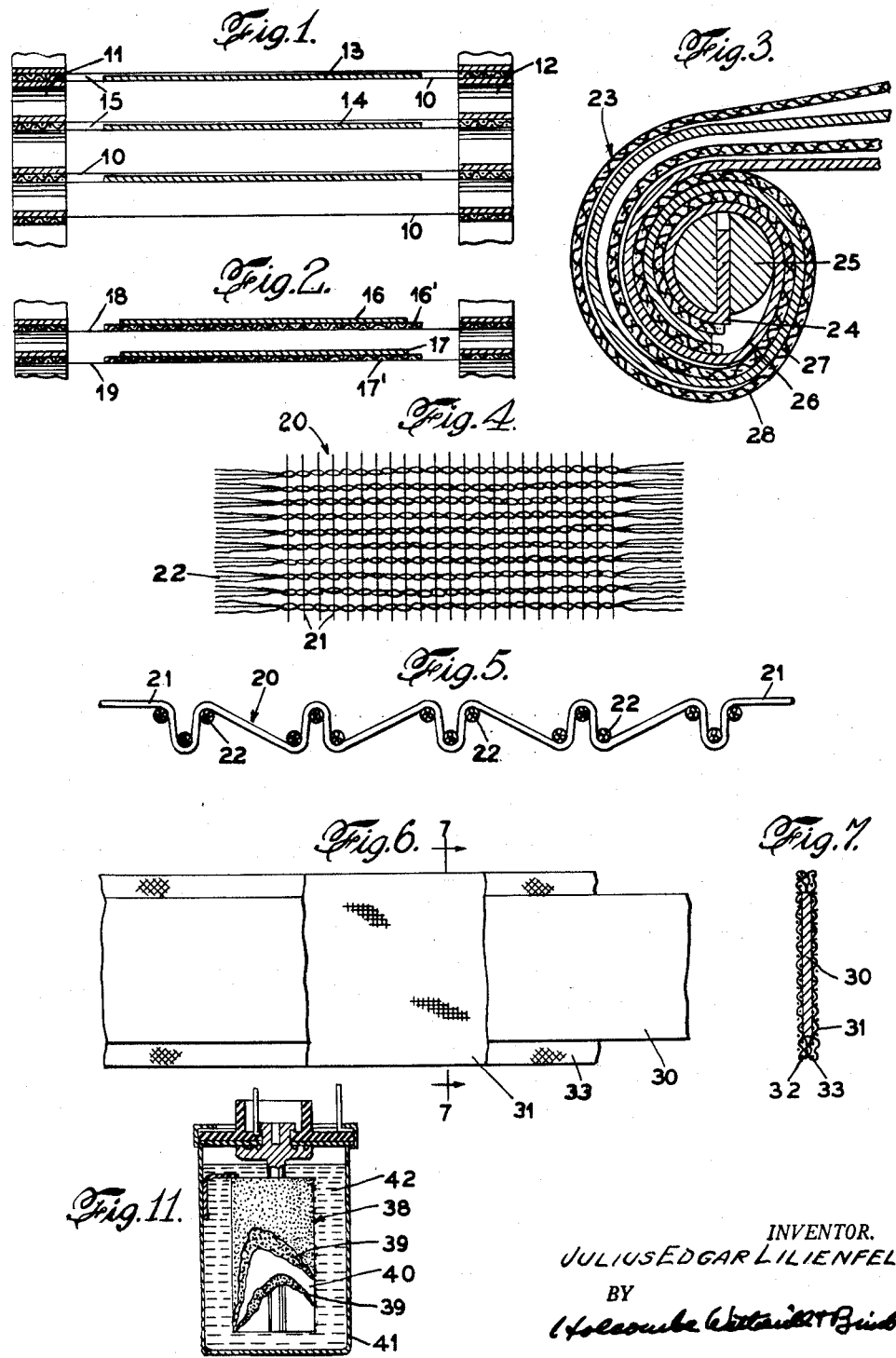
INVENTOR.
JULIUS EDGAR LILIENFELD
BY
ATTORNEYS.

March 15, 1960 J. E. LILIENFELD 2,929,004
ELECTROLYTIC CAPACITOR AND SEPARATOR THEREFOR
Filed Sept. 28, 1953 2 Sheets-Sheet 2

INVENTOR.
JULIUS EDGAR LILIENFELD
BY
ATTORNEYS.

2,929,004
ELECTROLYTIC CAPACITOR AND SEPARATOR THEREFOR

Julius Edgar Lilienfeld, St. Thomas, Virgin Islands, assignor to Samuel D. Warren, Essex, and Ralph F. Burkard, Arlington, Mass., jointly Application September 28, 1953, Serial No. 382,536

30 Claims. (Cl. 317—230)

The invention relates to electrolytic capacitors, more especially to capacitors suitable for operation with alternating voltages.

The problem arising in connection with the manufacture and operation of electrolytic capacitors, particularly on alternating current and of the coiled type wound with a separator, is stated in the Claassen U.S. Patent No. 2,220,887—second and third paragraphs, page 1 of the specification. To the best of my knowledge, no completely satisfactory remedy for the difficulties involved in the problem has heretofore been found.

The said problem, broadly speaking, is to produce an electrolytic capacitor of the narrow spaced, generally coiled electrodes type designed for operation with a freely flowing electrolyte, since thereby a wider range of applicability of the capacitor is secured. Electrolytic capacitors are being constructed in large quantities, however, for operation with highly viscous electrolytes. With viscous electrolytes, no difficulties of the aforesaid kind occur because such electrolytes afford a stratum of the electrolyte between the fibrous material of the spacer and the film of the anodized element so that there is in no place a direct immediate pressure contact between the material and the tightly wound anode. However, if the electrolyte be free flowing, then such pressure upon the film is unavoidable; and, unless the material has some very specific properties, the film deteriorates rather quickly at the points of pressure contact, appears clouded to the eye, and causes, among other things, a rapid increase of power loss.

In the hereinbefore noted patent, it was proposed to utilize a liquid electrolyte, but the suggested expedients of perforating the electrodes and of a loosely wound assembly are not likely to secure the desired result, inasmuch as unavoidably uncontrolled pressure in small areas will develop in the specifically proposed construction. It is well known in the art that one such bad area, though small, produces a totally bad condenser.

The present invention presents an entirely different solution of the problem. Contrary to the generally accepted conception that the highest obtainable wettability of the separator material is essential to the proper access of electrolyte to the anode, the invention contemplates the use of separator means of a porous or permeable nature and of a material which is much less wettable than the fibrous materials used heretofore. In contradistinction to highly viscous electrolytes, which being of a plastic consistency may be spread uniformly on a solid surface, with a freely flowing electrolyte a circumscribed stratum will assume a definite shape at its contour which is the border line of contact with said surface. The shape at this contour is best described in terms of the "contact angle" which is the angle between the surface on which the stratum rests and a tangent drawn, in the plane normal to the surface and normal to the stratum, at any point of contact of said stratum with this surface. The magnitude of this angle results from the equilibrium between the forces of cohesion within the liquid and those of molecular adhesion of the liquid to the surface. If the adhesion is by far the larger one of the two forces, then the angle approximates 180° and the liquid spreads all over the surface, no definite border line establishing itself. The larger the angle, the higher the wettability. Surfaces of different materials show different wettabilities; and the ones with the larger wettability tend to maintain a more intimate contact with the liquid.

In applying the aforesaid considerations to electrolytic condensers, it is of prime importance for the electrolyte to wet the anodized film and not to be drawn away from it by a highly wettable separator member. In the latter case, points of dry contact between separator and film develop, and/or tiny gas bubbles become trapped between separator and film; and at all such points the film's quality deteriorates, especially its power loss increases. Thus, the substance from which the separator is made has to be of a low wettability compared with that of the anodized film. I have found that a number of polymerized organic plastic filaments have that desirable property; and I prefer to use polyethylene for the said reason, also because it is the most nearly inert organic material in contact with organic electrolytes particularly if the polyethylene is of high molecular weight. Such polyethylene shows the remarkable property that a filmed condenser anode, even if wound so tightly therewith that it becomes corrugated through contact with the filaments of the fabric structure, will still develop no cloudiness of the film; and a steadily good performance for long periods is accomplished with a thin stratum of the electrolyte maintaining itself therebetween. Furthermore, formation of the anode in situ is made possible.

The invention has for an object to provide, in an electrolytic capacitor operable with a liquid electrolyte, separator means of a nature which will permit of a tight final assembly of the electrodes without developing pressure areas and marring of the anodized electrode or electrodes or otherwise impairing operation of the resulting capacitor; also, to preserve permanently a relatively thin stratum of the electrolyte in substantially complete contact with the anodic film of an anodized electrode.

Another object of the invention is to provide as material for separator means a polymerized organic compound which is of a substantially lower wettability than that of the anodized film with respect to an electrolyte comprising an organic solvent, said material being inert, however, as to the film of the anodized electrode, as well as to the electrolyte.

Still another object of the invention is to provide a separator material which introduces no substantial friction when associated with an anodized electrode and which, also, does not become brittle at low temperatures.

A further object is to provide a novel capacitor assembly, more particularly of the separator means and electrodes.

In carrying out the invention, the electrolyte utilized is a substantially anhydrous, free-flowing liquid comprising three components, to wit: a substantially insulating, non-hydrionizable organic liquid solvent means and a solute consisting of a weak organic acid component and a minor quantity of an alkali base component. Such an electrolyte is described more particularly in my U.S. Letters Patent No. 2,826,724, dated March 11, 1958.

My separator means is of a material which is of a foraminous or porous structure and consists of a polymerized organic compound of low wettability inert with respect to electrolytes of the aforesaid nature. I have discovered that such means may be associated with an anodized electrode, or electrodes, without marring its filmed surface or in any manner impairing operation of the capacitor. The said material may be variously assembled or applied with respect to the electrodes. It may, moreover, be utilized in monofilament form, as a foraminous fabric constructed of such filaments, and of novel weave, if desired; or as a spray-deposited mat; a spray-deposited porous stratum; or as a coating produced by applying an emulsion of polyethylene as hereinafter described.

The nature of the invention, however, will best be understood when described in connection with the accompanying drawings, in which:

Figs. 1 and 2 are fragmentary views illustrating various ways of associating the separator means with an electrode.

Fig. 3 is a transverse section, on an enlarged scale, illustrating electrodes and separator means coiled into a condenser.

Fig. 4 is a fragmentary plan of a section of fabric woven in a novel manner to constitute a separator band for the electrodes of a capacitor; and Fig. 5 is an enlarged, more or less diagrammatic transverse section through the fabric illustrating the weave.

Fig. 6 is a fragmentary plan of an anodized electrode mounted between separator bands; and Fig. 7 is a transverse section, taken on the line 7—7, Fig. 6, and looking in the direction of the arrows.

Fig. 11 is a partly-sectionized view of an electrolytic capacitor provided with the novel separator means.

Figure 8:
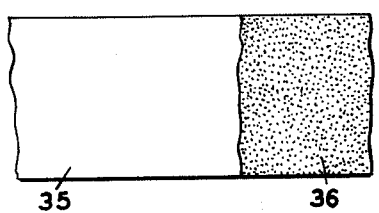
Fig. 8 is a fragmentary plan view, with portion of separator means broken away, illustrating a modifiction.

Referring to the drawings, there is indicated in the embodiment of the invention illustrated in Fig. 1 a novel supporting structure for the electrodes of an electrolytic capacitor, the same being in the nature of a grid-like member comprising a succession of cord-like elements 10. These are arranged to lie substantially parallel to one another and have their corresponding opposite ends secured to respective strips of separated parallel spacer elements 11, 12 at the top and bottom thereof. The said spacer elements are in the nature of narrow, corrugated strips of material such as an elastic and polymerized organic compound which is inert with respect to the electrolyte of the capacitor in which it is to be utilized. The cord-like elements 10, which are adapted to support directly the electrodes 13, 14 in pockets 15 formed between the spacers, are of like material and essentially one of low wettability. Among the polymerized organic compounds, polyethylene has been found to be most effective in this respect, particularly polyethylene which preliminarily to use has been heat-treated at a temperature above 55° C.

The mounting of the electrodes may be modified, for example as is indicated in Fig. 2, the electrodes 16, 17 in this embodiment being arranged to rest upon intermediate strips 16', 17', respectively, of fabric or other porous material also of polyethylene, said strips, in turn, being supported by the cord-like elements 18, 19. In such instance, it is preferred to construct the fabric 20, Figs. 4 and 5, in a novel manner by providing a weave in which the weft consists of monofilaments 21 and the warp of braids 22 comprising at least three monofilaments. By this expedient, contact between the fabric and the film electrode cannot develop along continuous lines and is rather reduced to point contacts, since the filaments weave up and down relatively to the electrode surface.

A fabric of this nature may be interposed directly between the electrodes. Thus, as is shown in Fig. 3 of the drawings, a coiled type condenser 23 of the polarized type is indicated, the cathode 24 being secured to a mandrel 25 over which it is coiled with an anodized electrode 26. Two bands 27 and 28 of the aforesaid fabric are provided over the anode, and the same with the electrodes, coiled in the conventional manner to afford the condenser.

Or, as is indicated in Figs. 6 and 7, a filmed electrode, as the electrode 30, may be entirely encased by a wrapping 31 of the polyethylene fabric, marginal strips 32 and 33 of this material being provided along opposite edges of the electrode 30.

Figure 9:
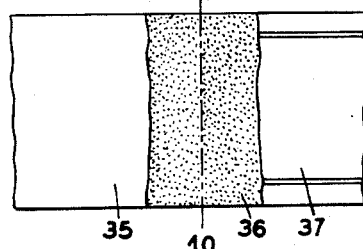
Fig. 9 is a similar view illustrating a further modification.
Figure 10:
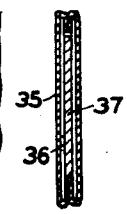
Fig. 10 is a transverse section taken on the line 10—10, Fig 9.

I have found it possible, also, to provide the insulating means as a spray-deposited mat or porous stratum, or applied emulsion of the polyethylene of a thickness of the order to 0.002 inch. Referring to Figs. 8 to 10, a porous flexible substance such as a strip of porous paper 35 serving as a base or carrier has polyethylene 36 pressure-sprayed over its surfaces, so that when the strip is juxtaposed to the film of an anode 37, as shown in Figs. 9 and 10, not only will the fibers of the base material be prevented from contacting the anode film and the latter be properly insulated but the electrolyte nevertheless will have ready access thereto through the porous stratum of polyethylene.

Figure 12:
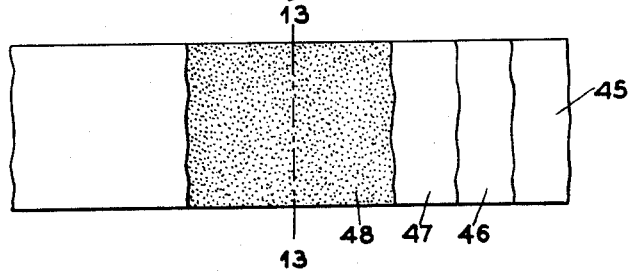
Fig. 12 is a plan view of a novel form of condenser electrode in which the anodized electrode is integrated with its separator means.
Figure 13:
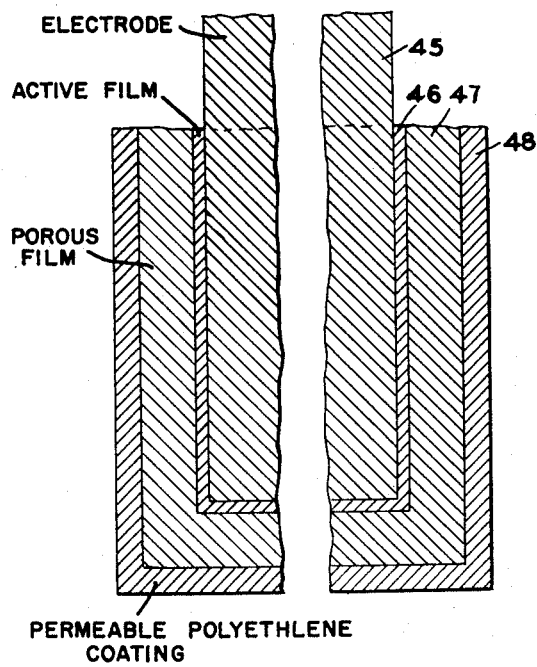
Fig. 13 is a transverse section therethrough taken on the line 13—13 thereof, the section being shown on a greatly enlarged scale.

In the case of a polarized condenser, the insulating polyethylene layer is sprayed on the cathode, in which case the specific double-film anode shown in Figs. 12 and 13 may be replaced by the conventional single-film anode for association with the said cathode in a capacitor.

Thus, as is shown in Fig. 11, the cathode 38 may have the mat 39 of polyethylene applied directly over its surfaces and wrapped together with the anode 40 for mounting within a suitable container 41 partly filled with electrolyte 42. However, it is not essneital in this instance that the electrodes be immersed in the electrolyte, as they may be dipped therein or moistened therewith initially and operate satisfactorily, for the anode is so much more wettable than the separator material 39 that enough of the electrolyte will be retained between the electrodes for effective operation of the capacitor—which is then substantially of the dry type. The moistening is conveniently effected during the coiling of the electrodes.

Figure 14:
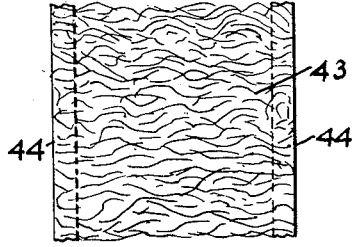
Fig. 14 is a fragmentary view illustrating a further form of the spray-deposited type of separator.

Another form of the separator is indicated in Fig. 14, the mat 43 being sprayed over, more or less tangentially, to become attached or welded to parallel narrow bands 44 of polyethylene.

Still another method of producing a porous stratum and utilizing it as a separator for the electrodes involves the discovery that polyethylene, while not likely to be attacked by most organic solvents, will at elevated temperatures (boiling point) be attacked by higher ketones, for example, methyl ethyl ketone or methyl isobutyl ketone, if the polyethylene be of low molecular weight, emulsifying it quite readily to produce a milky suspension. If that emulsion then be applied to a solid surface like glass or metal strip, it will produce a very well adhering, porous coating once the ketone has been evaporated, as by passage of a current of warm air thereover. The coating, by being extremely porous, will easily absorb acetone, higher ketones, or, for that matter, other organic solvents and electrolytes made up with them. Such coatings can be used as separators between an anodized electrode and a non-anodized electrode (polarized condenser—not shown) by applying the polyethylene emulsion to the non-anodized electrode (cathode). It is also feasible to apply the polyethylene emulsion to anodized surfaces in case of non-polarized capacitors; or, to apply it to thin strips of paper or cloth (not shown) which then can be used as separators without the deleterious effects which result otherwise from contacting anodized surfaces with the fibre of the separator strip.

In Figs. 12 and 13 a modification in the application of the porous spray-deposited polyethylene stratum is shown. In this embodiment, the material is applied directly to an anode 45. The latter, however, is of a special type, being of the nature of the anode disclosed in my United States Letters Patent No. 2,076,904, that is to say, the active stratum or film 46 is under-imposed with respect to an outer stratum or film 47 integral with the anode but of a porous and conductive nature. Over this outer film is deposited by spraying or other suitable means the insulating porous stratum 48 of polyethylene.

It is preferred to effect formation of the anodic film 46 in a substantially anhydrous electrolyte of the nature set forth in the aforesaid application Patent No. 2,826,724. Thus, the electrolyte may consist of a ketone as solvent, and an organic acid with an alkali metal constituent as solute. For example, an electrolyte consisting of acetone, phenol and sodium hydroxide has been found to produce most excellent results both for forming the anode therein and for functioning as the capacitor electrolyte.

Various modifications in the make-up and mode of application of the separator means may be made to suit different types of capacitors and conditions of use, and I do not restrict the invention to the specific embodiments herein illustrated.

I claim:

1. A condenser unit for an electrolytic capacitor of the type utilizing a freely flowing electrolyte of which the solvent comprises essentially an organic insulating compound, a weak organic acid and an alkali metal base comprising at least one anodized metal electrode and separator means associated therewith of a permeable structure consisting of a porous polymerized organic compound inert to the electrolyte and of lower wettability than said electrode with respect to the electrolyte.

2. A condenser unit according to claim 1, wherein the material of the separator means is polyethylene.

3. A condenser unit according to claim 2, wherein the polyethylene preliminarily to use has been heat-treated at a temperature above 55° C.

4. A condenser unit according to claim 2, wherein the material of the separator means is a fabric in which the weft consists of monofilaments and the warp of braids of at least three monofilaments.

5. A condenser unit according to claim 1, wherein the material of the separator means is a coherent strip of polyethylene of a porous structure.

6. A condenser unit according to claim 1, wherein the material of the separator means is a strip of porous supporting material faced with a spray-deposited matted porous stratum of polyethylene.

7. A condenser unit according to claim 1, wherein the separator means comprises a grid-like structure of polyethylene filaments substantially parallel to one another extending transversely over the anodized metal electrode.

8. A condenser unit according to claim 1, wherein the separator means comprises a band of foraminous fabric of polyethylene and individual longitudinal spacer elements of strips of polyethylene are provided along the respective margins of the band to form a pocket for an anodized electrode, and cord-like elements of polyethylene are attached at their opposite ends to the respective spacer elements along the length thereof and substantially parallel to one another.

9. A condenser unit according to claim 1, wherein the separator means comprise two superposed bands of polyethylene with an intermediate marginal strip thereof along their respective edges to form a pocket for the anodized electrode.

10. A condenser unit for an electrolytic condenser utilizing an essentially organic electrolyte, said unit comprising a pair of electrodes, the active surface of at least one of said electrodes being anodized and protected with a porous stratum permeable to the electrolyte of a polymerized organic compound of lower wettability by the electrolyte than said anodized electrode and inert with respect to the electrolyte, said stratum being interposed between said electrodes.

11. A condenser unit according to claim 10, wherein the condenser is of the free flowing electrolyte type and the associated cathode is covered with a porous stratum of spray-deposited polyethylene.

12. A condenser unit according to claim 10 a passivating metal electrode having an integral outer porous and conductive film with underimposed dielectric film, and a thin stratum of porous spray-deposited polyethylene overlying said porous film and permeable to the electrolyte.

13. The method of producing a condenser unit for an electrolytic capacitor of the type comprising at least two electrodes positioned in a liquid organic electrolyte and separated by an insulating stratum, said method comprising the steps of anodizing at least one of said electrodes, dispersing polyethylene in a vaporizable solvent, said polyethylene being of a lower wettability in the electrolyte than the anodized electrode, applying to the surface of one of said electrodes the dispersion so formed, evaporating the solvent to leave upon said surface a porous, adherent coating of polyethylene permeable to said electrolyte, and positioning said electrodes in said electrolyte.

14. A method as set forth in claim 13, wherein the polyethylene is dispersed with a higher ketone than acetone as solvent.

15. A method as set forth in claim 14 wherein the polyethylene is dispersed with methyl ethyl ketone as solvent.

16. A method as set forth in claim 15 wherein the polyethylene is dispersed with methyl isobutyl ketone as solvent.

17. The method of producing a filming metal anode for use in electrolytic capacitors operating with a liquid organic electrolyte of the type described, which comprises first anodizing over the surface of the metal a layer of a compound thereof conductive in an operating electrolyte; and then underimposing beneath said layer, by formation in a different electrolyte from that in which said conductive layer was formed, a layer of a compound of said metal which is a dielectric and non-conductive in the operating electrolyte; and applying a porous coating of an insulating material over said conductive layer which is inert to said operating electrolyte and of a lower wettability with respect thereto than that of the anode, whereby said electrolyte permeates said coating when said anode is immersed therein.

18. The method according to claim 17, wherein polyethylene is matted over the conductive portion of the anode.

19. The method according to claim 17, wherein the formation accomplished with respect to the dielectric layer occurs in an anhydrous electrolyte comprising a ketone as solvent.

20. The method according to claim 19, wherein the anhydrous electrolyte comprises an organic acid as solute.

21. An anode for use in electrolytic capacitors operating with anhydrous electrolytes and consisting of a filming metal with bilaminate, integral, formed layers embodying distinct compounds of said filming metal, the outer layer being porous and conductive in a hydrous electrolyte; and the proximate layer being the product of formation in a substantially anhydrous electrolyte and highly non-conductive therein; and an insulating coating on said outer porous layer permeable to said anhydrous electrolytes and of a wettability thereby lower than that of said porous outer layer.

22. An anode according to claim 21 wherein a thin mat of a permeable polymerized organic compound overlies the porous layer.

23. An anode according to claim 22, wherein the mat consists of a matted polyethylene.

24. A filming metal element with bilaminate integral layers embodying distinct compounds of the metal according to claim 21, the outer one being the product of formation in a hydrous electrolyte and the proximate one the product of formation in an anhydrous electrolyte, and an insulating coating of polyethylene.

25. A filming metal element according to claim 24, wherein the proximate layer is the product of formation of the metal element in an electrolyte comprising a ketone as solvent and a weak organic acid with an alkali metal constituent as solute.

26. A filming metal element according to claim 25, wherein the proximate layer is the product of formation of the metal element in acetone, phenol and sodium hydroxide.

27. An electrolytic capacitor comprising a receptacle containing a freely flowing liquid electrolyte comprising a substantially insulating organic solvent and a binary solute consisting of a weak organic acid component and a minor quantity of an alkali metal base component; an electrode structure therein embodying a plurality of electrodes at least one of which is anodized; and insulating separator means for said electrodes comprising a porous coherent stratum of polymerized organic substance permeable to said electrolyte and inert with respect thereto, said separator means being of a wettability by the electrolyte substantially lower than that of the anodized electrode; and terminals for the electrodes extending externally of the receptacle.

28. An electrolytic capacitor according to claim 27, wherein the separator means consists of finely dispersed polyethylene.

29. An electrolytic capacitor according to claim 27, wherein the electrolyte is substantially nonaqueous.

30. An electrolytic capacitor according to claim 27, wherein the electrolyte consists of a ketone, a phenol and a minor quantity of an alkali metal base component.

References Cited in the file of this patent

UNITED STATES PATENTS

| | | |
|---|---|---|
| 1,986,779 | Lilienfeld | Jan. 1, 1935 |
| 2,076,904 | Lilienfeld | Apr. 13, 1937 |
| 2,117,874 | Clark | May 17, 1938 |
| 2,120,426 | Herrmann | June 14, 1938 |
| 2,220,887 | Claassen | Nov. 12, 1940 |
| 2,229,431 | Young | Jan. 21, 1941 |
| 2,231,319 | Burgess | Feb. 11, 1941 |
| 2,310,932 | Brennan | Feb. 16, 1943 |
| 2,561,951 | Roberts | July 24, 1951 |
| 2,593,922 | Robinson et al. | Apr. 22, 1952 |
| 2,647,079 | Burnham | July 28, 1953 |
| 2,686,892 | Lilienfeld | Aug. 17, 1954 |
| 2,722,637 | Brennan | Nov. 1, 1955 |
| 2,742,596 | Lilienfeld | Apr. 17, 1956 |
| 2,826,724 | Lilienfeld | Mar. 11, 1958 |